United States Patent
Bates et al.

(10) Patent No.: US 7,937,529 B2
(45) Date of Patent: May 3, 2011

(54) DETECTION OF FREQUENT IMPROPER REMOVALS OF AND CHANGING WRITING POLICIES TO PREVENT DATA LOSS IN MEMORY STICKS

(75) Inventors: Cary L. Bates, Rochester, MN (US); Matthew G. Kelm, Rochester, MN (US); Brian E. Smith, Rochester, MN (US); Dennis J. Spathis, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 12/144,161

(22) Filed: Jun. 23, 2008

(65) Prior Publication Data
US 2009/0319725 A1    Dec. 24, 2009

(51) Int. Cl.
*G06F 12/00* (2006.01)
*G06F 13/00* (2006.01)
(52) U.S. Cl. ............ 711/115; 710/303; 711/E12.103
(58) Field of Classification Search .................. None
See application file for complete search history.

(56) References Cited

U.S. PATENT DOCUMENTS

| | | | |
|---|---|---|---|
| 2004/0024965 A1* | 2/2004 | Suzuki et al. | 711/115 |
| 2004/0199898 A1* | 10/2004 | Glass et al. | 717/120 |
| 2008/0098172 A1* | 4/2008 | Tsang et al. | 711/115 |

* cited by examiner

*Primary Examiner* — Reginald G Bragdon
*Assistant Examiner* — Aracelis Ruiz
(74) *Attorney, Agent, or Firm* — Cantor Colburn LLP

(57) ABSTRACT

Methods, system and computer program products for detection of frequent improper removals of and changing writing policies to prevent data loss in memory sticks. Exemplary embodiments include a method including detecting insertions of the memory stick, detecting removals of the memory stick, tracking a number of times the memory stick has been docked when removed, tracking a number of times the memory stick has been undocked when removed, determining a removal ratio of times the memory has been removed when docked to the number of times the memory stick has been removed when undocked, comparing the removal ratio to a predetermined threshold, caching writes and directory updates, and committing the writes and directory updates to the memory stick when the removal ratio is below the predetermined threshold and, flushing all writes and updates to the memory stick when in the removal ratio is equal to or above the predetermined threshold.

5 Claims, 2 Drawing Sheets

DETECTION OF FREQUENT IMPROPER REMOVALS OF AND CHANGING WRITING POLICIES TO PREVENT DATA LOSS IN MEMORY STICKS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to memory sticks, and particularly to methods, system and computer program products for detection of frequent improper removals of and changing writing policies to prevent data loss in memory sticks.

2. Description of Background

Memory sticks are storage devices that have increasing storage capacity and widespread use. A problem with large-capacity memory sticks is that the transfer rate of the USB port has not matched the larger capacity memory sticks and it can take longer to flush cached pages to the memory stick. Many users without technical understanding do not understand the need to undock the memory stick, and simply pull it out of the computer when they are done. With larger capacity memory sticks holding large items like .wav and .mp3 files, where caching is needed to improve performance, it becomes easier to corrupt the data on the stick by removing it without undocking. Another problem that can occur when a memory stick is not properly undocked is that a voltage spike may occur damaging the memory stick. There is enough power on a USB port that some users have seen a spark when a device is pulled without being undocked.

SUMMARY OF THE INVENTION

Exemplary embodiments include a method for detecting frequent improper removals of a memory stick in a port and changing writing policies to prevent data loss in the memory stick, the method including detecting a plurality of insertions of the memory stick, detecting a plurality of removals of the memory stick, tracking a number of times the memory stick has been docked when removed, tracking a number of times the memory stick has been undocked when removed, determining a removal ratio of times the memory has been removed when docked to the number of times the memory stick has been removed when undocked, comparing the removal ratio to a predetermined threshold, in response to the removal ratio being below the predetermined threshold, caching writes and directory updates, and committing the writes and directory updates to the memory stick when required by a respective application and when the memory stick is undocked and in response to the removal ratio being equal to or above the predetermined threshold, flushing all writes and updates to the memory stick at a predetermined time.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which detects and tracks when the memory stick is removed from the computer without being undocked. The driver tracks the ratio of times the stick is pulled without being undocked. If this ratio exceeds a threshold value the operating system determines that the stick is likely to be pulled and rather than caching any of the directory updates or writes to improve performance it flushes all writes and updates to the stick at the earliest possible moment. In the event the stick is seldom or never pulled out without being undocked, the operating system can improve performance (and the life of the memory stick) by caching writes and directory updates and commit them to the stick only when needed or undocked. Likewise, when reading from a memory stick (when the threshold has been exceeded), the system may choose to read and buffer more data to allow applications to terminate more gracefully just in case the stick is pulled.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments include methods, systems and computer products having a driver/OS feature that detects and tracks when the memory stick is removed from the computer without being undocked. The driver tracks the ratio of times the stick is pulled without being undocked. If this ratio exceeds a threshold value the operating system determines that the stick is likely to be pulled and rather than caching any of the directory updates or writes to improve performance it flushes all writes and updates to the stick at the earliest possible moment. In the event the stick is seldom or never pulled out without being undocked, the operating system can improve performance (and the life of the memory stick) by caching writes and directory updates and commit them to the stick only when needed or undocked. Likewise, when reading from a memory stick (when the threshold has been exceeded), the system may choose to read and buffer more data to allow applications to terminate more gracefully just in case the stick is pulled.

Additionally when it is determined that the user's history indicates they may just pull the stick without undocking it, the power to the USB device is also turned off soon after activity between the device and the computer ceases. So if an application writes to the USB device and does nothing with it for a specified time period (e.g., one or two seconds) the USB port is powered down. Then, when the application needs the device again the USB port is powered back up.

Figure 1:
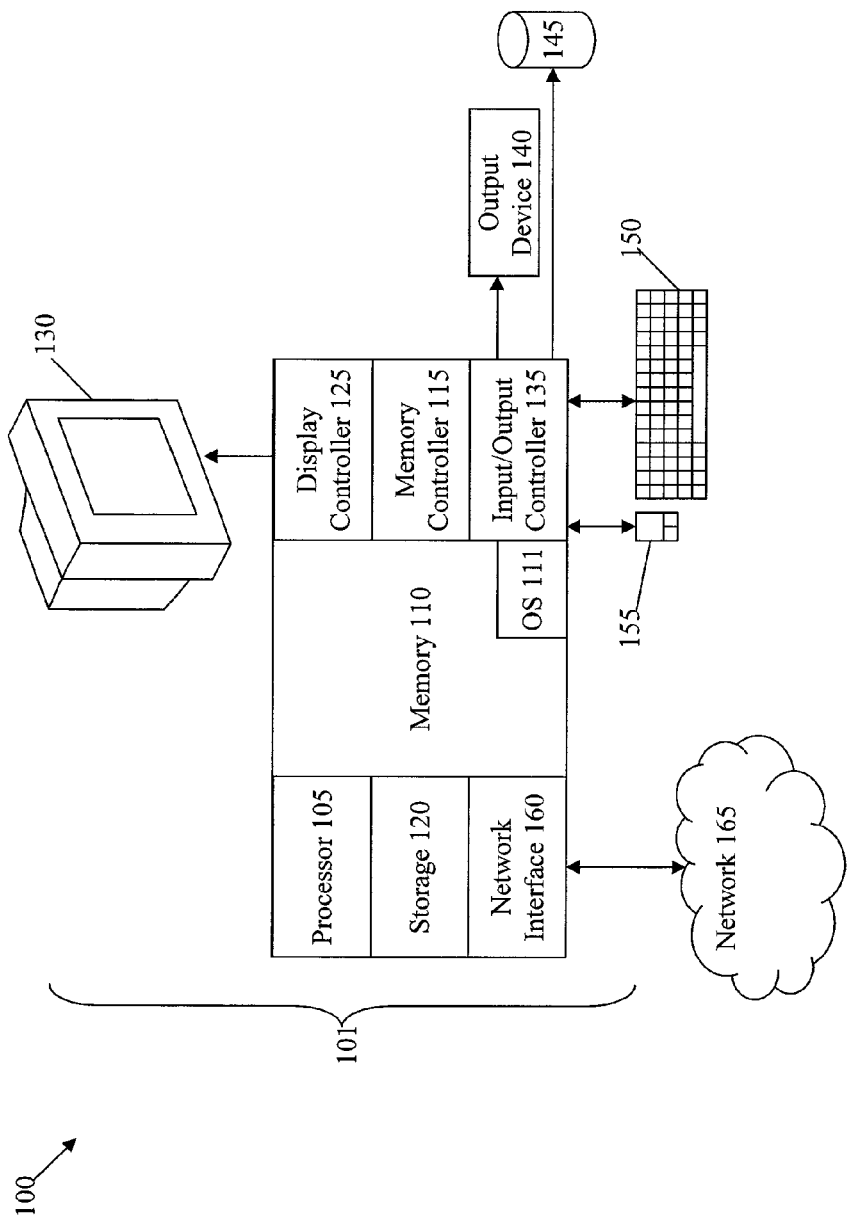
FIG. 1 illustrates an exemplary embodiment of a system for detection of frequent improper removals of and changing writing policies to prevent data loss in memory sticks.

FIG. 1 illustrates an exemplary embodiment of a system 100 for detection of frequent improper removals of and changing writing policies to prevent data loss in memory sticks. The methods described herein can be implemented in software (e.g., firmware), hardware, or a combination thereof In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described further herein, the I/O devices 140, 145 may be a memory stick or other removable memory device configured to be inserted and removed from a port (e.g., a universal serial bus (USB) port), which has either been properly undocked or not.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the memory stick removal and writing policy change methods described herein in accordance with exemplary embodiments and a suitable operating system (OS) 111. The operating system 111 essentially controls the execution of other computer programs, such the memory stick removal and writing policy change systems and methods described herein, and provides scheduling, input-output control, file and data management, memory management, and communication control and related services.

The memory stick removal and writing policy change methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the memory stick removal and writing policy change methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The memory stick removal and writing policy change methods described herein and the OS 111, in whole or in part, but typically the latter, are read by the processor 105, perhaps buffered within the processor 105, and then executed.

When the systems and methods described herein are implemented in software, as is shown in FIG. 1, it the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The memory stick removal and writing policy change methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the memory stick removal and writing policy change methods are implemented in hardware, the memory stick removal and writing policy change methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In exemplary embodiments, when a USB device is inserted, the USB hub looks for drivers that it determines should be able to handle the device and calls a probe interface on the driver. The driver then determines if it is appropriate for the device. When the device is to be disconnected a disconnect interface is called. The fact that the USB device has been prematurely disconnected from the system may either be determined by the hub, or the device driver when its disconnect logic can not talk to the device.

In exemplary embodiments, the tracking mechanism simply keeps two counters on the system for successful and unsuccessful disconnects. When a device is undocked and disconnects successfully the successful counter is increased, but when the device driver fails to contact, the device for a proper disconnect the other counter is increased.

In exemplary embodiments, the device driver can use this information to enter into higher performance operating modes when the ratio of good to bad disconnects highly favors a user who appropriately undocks the memory stick. These higher performance modes allow data to be cached in local memory and can dramatically speed up writes and reads to and from the stick, allowing the slower transfer of data to the memory stick to occur in parallel with the applications processing.

In the event that the ratio of successful to unsuccessful dockings indicates that the user could pull the memory stick without properly undocking, the driver becomes more defensive, and writes the data to the stick immediately making other operations wait for the data to be transferred. In this way, the memory stick is more likely to contain the data the user expects should the stick be pulled.

In order to ensure the ratio of successful to unsuccessful disconnects reflects what the user has done recently the counts could be made to erode over time. (Say subtract 0.25 from each count every day until one goes to zero) or in an embodiment where the successful and unsuccessful disconnects are kept as records in a data file, after some period of time old records could simply be deleted.

Additionally when it is determined that the user's history indicates they may just pull the stick without undocking it, the power to the USB device is also turned off soon after activity between the device and the computer ceases. If the ratio of successful to unsuccessful undocking indicates that the user could pull the memory stick without properly undocking and there is no activity against the USB device for a specified time period, the USB port may be powered down. Then, when an application needs the device again is USB is powered back up. In the event that the ratio of successful to unsuccessful undocking indicates that the user is very unlikely to pull the memory stick without properly undocking the stick will remain powered up for much longer since the thread of damage to the memory stick from a voltage spike is greatly reduced. This feature may allow for greater performance as the device need not be powered back up.

Figure 2:
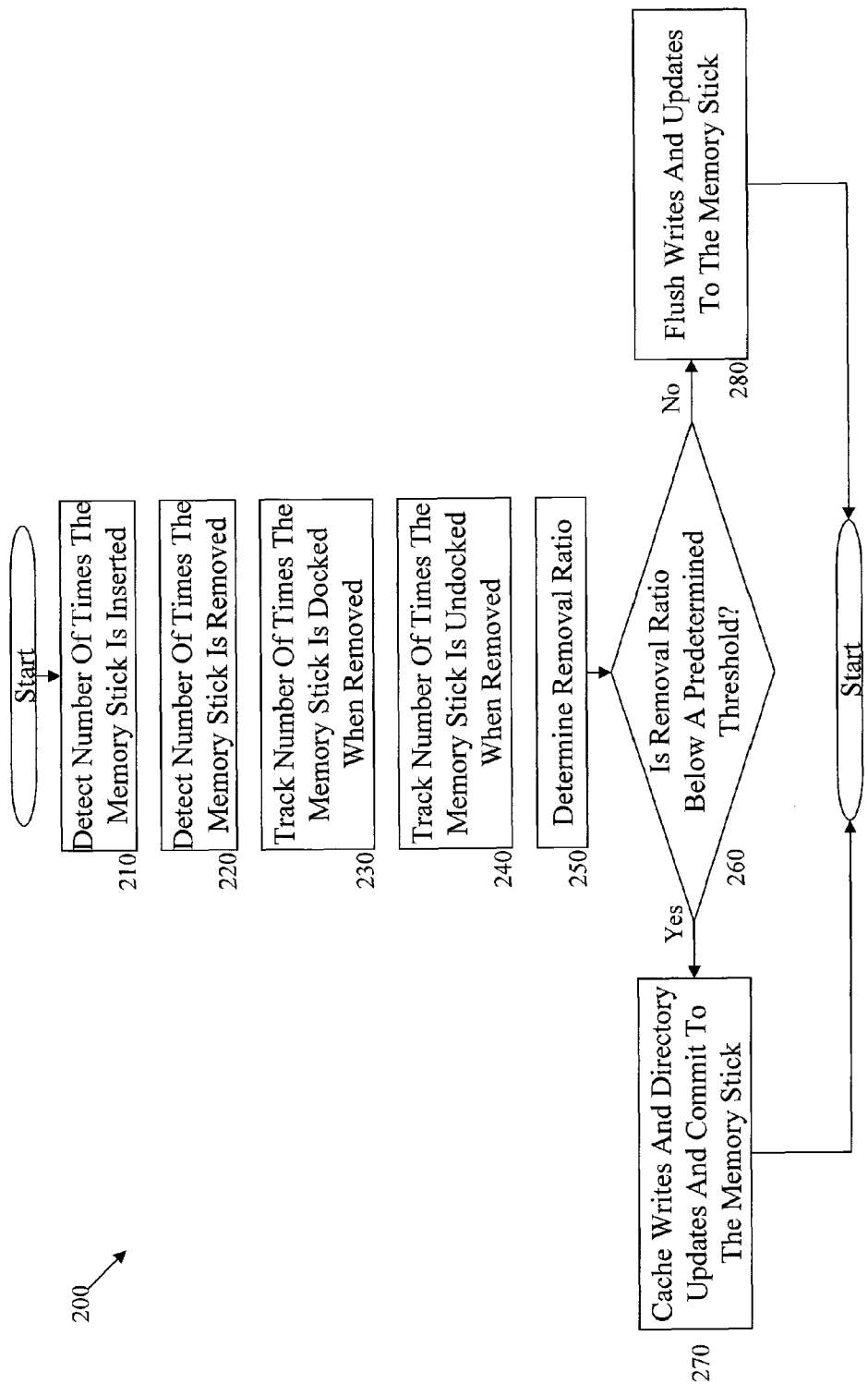
FIG. 2 illustrates a flow chart of a method for detection of frequent improper removals of and changing writing policies to prevent data loss in memory sticks in accordance with exemplary embodiments.

FIG. 2 illustrates a flow chart of a method 200 for detection of frequent improper removals of and changing writing policies to prevent data loss in memory sticks in accordance with exemplary embodiments. At block 210, the system 100 detects the number of times that the memory stick is inserted. At block 220, the system 100 determines the number of times that the memory stick has been removed. At block 230, the system 100 tracks a number of times the memory stick has been docked when removed. In exemplary embodiments, the system 100 maintains a non-success counter that is incremented upon the removal of the memory stick when the memory stick is docked. At block 240, the system 100 tracks a number of times the memory stick has been undocked when removed. In exemplary embodiments, the system 100 also maintains a success counter that is incremented upon the removal of the memory stick when the memory stick is undocked. At block 250, the system 100 determines a removal ratio of times the memory has been removed when docked to the number of times the memory stick has been removed when undocked. At block 260, the system 100 compares the removal ratio to a predetermined threshold. If at block 260, the system determines that the removal ratio is below the predetermined threshold, the system 100 caches writes and directory updates, and commits the writes and directory updates to the memory stick when required by a respective application and when the memory stick is undocked. If at block 260, the system determines that the removal ratio is not below the predetermined threshold (e.g., equal to or above the predetermined threshold), the system 100 flushes all writes and updates to the memory stick at a predetermined time. In exemplary embodiments, in response to the removal ratio being above the predetermined threshold, and when an application is reading from the memory stick, the system 100 can read and buffer additional data to allow the application to terminate gracefully. In exemplary embodiments, in response to the removal ratio being below the predetermined threshold, the system 100 can remove power from the port when the port ceases transferring data to and from the memory stick and then can provide power to the port in response to a data transfer to and from the port.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for detecting frequent improper removals of a memory stick in a port and changing writing policies to prevent data loss in the memory stick, the method comprising:
   detecting a plurality of insertions of the memory stick;
   detecting a plurality of removals of the memory stick;
   tracking a number of times the memory stick has been docked when removed;
   tracking a number of times the memory stick has been undocked when removed;
   determining a removal ratio of times the memory has been removed when docked to the number of times the memory stick has been removed when undocked;
   comparing the removal ratio to a predetermined threshold;
   in response to the removal ratio being below the predetermined threshold, caching writes and directory updates, and committing the writes and directory updates to the memory stick when required by a respective application and when the memory stick is undocked; and
   in response to the removal ratio being equal to or above the predetermined threshold, flushing all writes and updates to the memory stick at a predetermined time.

2. The method as claimed in claim 1 further comprising in response to the removal ratio being above the predetermined threshold, when an application is reading from the memory stick, reading and buffering additional data to allow the application to terminate gracefully.

3. The method as claimed in claim 2 further comprising:
   in response to the removal ratio being below the predetermined threshold, removing power from the port when the port ceases transferring data to and from the memory stick; and
   providing power to the port in response to a data transfer to and from the port.

4. The method as claimed in claim 3 wherein tracking a number of times the memory stick has been docked when removed comprises maintaining a non-success counter that is incremented upon the removal of the memory stick when the memory stick is docked.

5. The method as claimed in claim 4 wherein tracking a number of times the memory stick has been undocked when removed comprises maintaining a success counter that is incremented upon the removal of the memory stick when the memory stick is undocked.

* * * * *